United States Patent
Ozaki (10) Patent No.: US 10,183,435 B2
(45) Date of Patent: Jan. 22, 2019

(54) METHOD FOR MANUFACTURING CONTAINER WITH HANDLE, APPARATUS FOR MANUFACTURING CONTAINER WITH HANDLE, AND CONTAINER WITH HANDLE

(71) Applicant: NISSEI ASB MACHINE CO., LTD., Komoro-shi, Nagano (JP)

(72) Inventor: Yasuo Ozaki, Komoro (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 215 days.

(21) Appl. No.: 14/912,889

(22) PCT Filed: Aug. 14, 2014

(86) PCT No.: PCT/JP2014/071448
§ 371 (c)(1),
(2) Date: Feb. 18, 2016

(87) PCT Pub. No.: WO2015/025797
PCT Pub. Date: Feb. 26, 2015

(65) Prior Publication Data
US 2016/0207243 A1    Jul. 21, 2016

(30) Foreign Application Priority Data
Aug. 21, 2013  (JP) .................................. 2013-171015

(51) Int. Cl.
*B29C 49/18*  (2006.01)
*B65D 23/10*  (2006.01)
(Continued)

(52) U.S. Cl.
CPC ............ *B29C 49/185* (2013.01); *B29C 49/20* (2013.01); *B29C 49/482* (2013.01);
(Continued)

(58) Field of Classification Search
None
See application file for complete search history.

(56) References Cited

U.S. PATENT DOCUMENTS

| 5,535,901 A | 7/1996 | Ishii et al. |
| 2005/0048237 A1* | 3/2005 | Kim .................. B29B 13/024 428/35.7 |

(Continued)

FOREIGN PATENT DOCUMENTS

| CN | 1636702 A | 7/2005 |
| CN | 102470601 A | 5/2012 |

(Continued)

OTHER PUBLICATIONS

Chinese Patent Office Action dated Jul. 6, 2017 for Application No. 201480046167.X.

(Continued)

*Primary Examiner* — Monica A Huson
(74) *Attorney, Agent, or Firm* — David L. Hoffman; Hoffman Patent Group (57) ABSTRACT

A manufacturing method for manufacturing a container with a handle, the method including a primary blow molding step of blow-molding a preform made of a polyethylene terephthalate resin to mold an intermediate molded body, and a secondary blow molding step of assembling the handle to a container body, which is made of the intermediate molded body expanded inside a blow mold, by arranging the intermediate molded body inside the blow mold which holds the handle by an inner surface thereof and blow-molding the intermediate molded body in a state where the handle is brought close to the intermediate molded body.

5 Claims, 9 Drawing Sheets

(51) Int. Cl.
  *B29C 49/20* (2006.01)
  *B29C 49/48* (2006.01)
  *B65D 25/28* (2006.01)
  *B29C 49/06* (2006.01)
  *B29L 31/00* (2006.01)
  *B29K 67/00* (2006.01)
  *B29K 105/00* (2006.01)

(52) U.S. Cl.
  CPC ....... *B65D 23/106* (2013.01); *B65D 25/2885* (2013.01); *B29C 49/06* (2013.01); *B29C 2049/2017* (2013.01); *B29C 2049/2039* (2013.01); *B29K 2067/003* (2013.01); *B29K 2105/258* (2013.01); *B29L 2031/7158* (2013.01)

(56) References Cited

U.S. PATENT DOCUMENTS

| | | |
|---|---|---|
| 2010/0187246 A1 | 6/2010 | Miura |
| 2012/0132608 A1 | 5/2012 | Aoki et al. |
| 2012/0292830 A1 | 11/2012 | Miura |
| 2014/0190924 A1 | 7/2014 | Aoki et al. |
| 2015/0166211 A1 | 6/2015 | Aoki et al. |

FOREIGN PATENT DOCUMENTS

| | | |
|---|---|---|
| CN | 102656001 A | 9/2012 |
| JP | 04052125 A | 2/1992 |
| JP | 04168029 A | 6/1992 |
| JP | 05154897 A | 6/1993 |
| JP | 07032455 | 2/1995 |
| JP | 07276478 A | 10/1995 |
| JP | 08034443 A | 2/1996 |
| JP | 08183535 A | 7/1996 |
| JP | 08300452 A | 11/1996 |
| JP | 2000-335584 A | 12/2000 |
| JP | 2001048183 A1 | 2/2001 |
| JP | 2003-236923 A | 8/2003 |
| JP | 2006327666 A | 12/2006 |
| JP | 3936103 A | 6/2007 |
| JP | 2008044627 A1 | 2/2008 |
| JP | 2009-184258 A | 8/2009 |
| JP | 2009-214884 A | 9/2009 |
| JP | 2009-234637 A | 10/2009 |
| JP | 4804264 A | 8/2011 |
| JP | 2011-189993 A | 9/2011 |
| JP | 2011213418 A | 10/2011 |
| WO | 2008-146509 A1 | 4/2008 |
| WO | 2012-052837 A1 | 4/2012 |

OTHER PUBLICATIONS

International Search Report dated Oct. 28, 2014 for Application No. PCT/JP2014/071448.
International Search Opinion dated Oct. 28, 2014 for Application No. PCT/JP2014/071448.
Chinese Patent Office Action dated Oct. 31, 2016 for Application No. 201480046167.X (17 pages including translation).
Japanese Office Action in Application No. 2015532840 dated Jun. 12, 2018.

* cited by examiner

METHOD FOR MANUFACTURING CONTAINER WITH HANDLE, APPARATUS FOR MANUFACTURING CONTAINER WITH HANDLE, AND CONTAINER WITH HANDLE

TECHNICAL FIELD

The present invention relates to a method for manufacturing a container with a handle, an apparatus for manufacturing the container with the handle, and the container with the handle.

BACKGROUND ART

In recent years, a large-size returnable container with a large capacity of, for example, 3 to 5 gallons (about 12 to 20 liters) has become widespread as a reusable container for drink such as mineral water. Such a large-capacity container becomes heavy in weight due to filling with liquid as the drink. As a result, a container with a handle attached to a trunk part of the container for the purpose of convenience at the time of conveyance is known (for example, see Patent References 1 to 5).

PRIOR ART REFERENCE

Patent Reference

Patent Reference 1: Japanese Patent No. 4804264
Patent Reference 2: Japanese Patent No. 3936103
Patent Reference 3: JP-A-2009-214884
Patent Reference 4: International Publication No. 2012/52837
Patent Reference 5: International Publication No. 2008/146509

DISCLOSURE OF THE INVENTION

Problems that the Invention is to Solve

The container with the handle described above is generally manufactured by blow-molding a preform made of a polycarbonate resin with high heat resistance.

However, in a synthetic resin such as the polycarbonate resin using the bisphenol A as a raw material, it is pointed out that a component of bisphenol A is melted in the case of being washed with heavy-duty detergent or the case of making contact with acid or high-temperature liquid.

Hence, it is proposed that the container with the handle is manufactured using a polyethylene terephthalate (PET) resin instead of the polycarbonate resin. However, in the case of manufacturing the container with the handle by blow-molding a preform made of the polyethylene terephthalate resin using a conventional manufacturing process, it is difficult to reliably attach the handle to the container while providing the container with heat resistance.

An object of the invention is to provide a method for manufacturing a container with a handle, an apparatus for manufacturing the container with the handle, and the container with the handle, in which assembling of the handle to a container body while increasing heat resistance of the container body made of a polyethylene terephthalate resin is capable.

Means for Solving the Problems

A method for manufacturing a container with a handle of the invention capable of solving the above-described problem is characterized by including: a primary blow molding step of blow-molding a preform made of a polyethylene terephthalate resin to mold an intermediate molded body; and a secondary blow molding step of assembling the handle to a container body, which is made of the intermediate molded body expanded inside a blow mold, by arranging the intermediate molded body inside the blow mold which holds the handle by an inner surface thereof and blow-molding the intermediate molded body in a state where the handle is brought close to the intermediate molded body.

According to this method for manufacturing the container with the handle, the container body with high heat resistance can be molded of the preform made of the polyethylene terephthalate resin by performing the blow molding a plurality of times in the primary blow molding step and the secondary blow molding step. Further, the handle can reliably be assembled to the intermediate molded body by performing the blow molding with the handle brought close to the intermediate molded body in the secondary blow molding step. Accordingly, the container with the handle made of the polyethylene terephthalate resin with high heat resistance can be manufactured without using a polycarbonate resin.

In the method for manufacturing the container with the handle of the invention, in the secondary blow molding step, a part of the handle may be pushed on the intermediate molded body to be brought into contact with the intermediate molded body.

According to this method for manufacturing the container with the handle, in the secondary blow molding step, since a part of the handle is pushed on the intermediate molded body to be brought into contact with intermediate molded body, the handle can be caused to bite into the container body expanded by the blow molding, and the handle can more reliably be assembled to the container body.

In the method for manufacturing the container with the handle of the invention, in the secondary blow molding step, a non-contact part between the handle and the intermediate molded body may be formed in a vicinity of a place in which the handle is pushed on the intermediate molded body.

According to this method for manufacturing the container with the handle, in the secondary blow molding step, by forming the non-contact part in the vicinity of a place in which the handle is pushed on the intermediate molded body, the intermediate molded body expanded by the blow molding can be smoothly deformed in the periphery of the non-contact part. Consequently, the handle can more reliably be assembled to the container body.

In the method for manufacturing the container with the handle of the invention, in the primary blow molding step, a recess may be formed to a part of the intermediate molded body, and at the time of a blow start in the secondary blow molding step, the handle may be arranged in the recess of the intermediate molded body in a state where the handle is not brought into contact with the intermediate molded body.

Accordingly, occurrence of defects in molding, for example, occurrence of uneven wall thickness distribution or occurrence of a burst in a part of the intermediate molded body can be suppressed in a process of expanding the intermediate molded body.

In the method for manufacturing the container with the handle of the invention, the handle may include a rod-shaped gripping part capable of being gripped, an attachment rod part joined to the gripping part at upper and lower ends thereof by joint parts and arranged so as to be spaced from the gripping part, and locking parts protruding in substantially a vertical direction from the upper and lower ends of the attachment rod part, and in the secondary blow molding step, the attachment rod part may be arranged in a state brought close to the intermediate molded body, chevron-shaped protrusions, which are made of a part of the container body, protrude toward a side of the gripping part and lock the attachment rod part and the joint parts, may be molded at both sides of the attachment rod part in a width direction, and fitting parts, which are made of a part of the container body, enter the joint parts sides than the locking parts and lock the locking parts, may also be molded.

According to this method for manufacturing the container with the handle, the chevron-shaped protrusions lock both sides of the left and right of the joint parts and the attachment rod part. Consequently, the handle is assembled to the container body in a state where movement of the handle in a horizontal direction with respect to the container body is regulated by the chevron-shaped protrusions. Also, the fitting parts lock the locking parts of the handle. Consequently, the handle is assembled to the container body in a state where movement of the handle in the vertical direction and a separated direction (the direction in which the handle is separated from the container body, the direction from the attachment rod part toward the gripping part) with respect to the container body is regulated by the fitting parts. Accordingly, strength of fixing of the handle to the container body can be enhanced greatly.

Further, an apparatus for manufacturing a container with a handle of the invention capable of solving the above-described problem is characterized by including: primary blow molding means for blow-molding a preform made of a polyethylene terephthalate resin to mold an intermediate molded body, and secondary blow molding means for assembling the handle to a container body, which is made of the intermediate molded body expanded inside a blow mold, by arranging the intermediate molded body inside the blow mold which holds the handle by an inner surface thereof and blow-molding the intermediate molded body in a state where the handle is brought close to the intermediate molded body.

According to this manufacturing apparatus, the manufacturing method described above can be performed to manufacture the container with the handle made of the polyethylene terephthalate resin with high heat resistance.

The blow mold of the secondary blow molding means of the manufacturing apparatus of the invention may include a handle holding part that holds the handle in a state where a part of the handle is pushed on the intermediate molded body to be brought into contact with the intermediate molded body. According to this configuration, the container with the handle in which the handle is more reliably assembled to the container body can be manufactured.

The primary blow molding means of the manufacturing apparatus of the invention may be capable of molding the intermediate molded body having a recess, and the blow mold may include a handle holding part capable of holding the handle inside the recess in a state where the handle is not brought into contact with the intermediate molded body. According to this configuration, occurrence of defects in molding, for example, occurrence of uneven wall thickness distribution or occurrence of a burst in a part of the intermediate molded body can be suppressed in a process of expanding the intermediate molded body.

Further, a container with a handle of the invention capable of solving the above-described problem is characterized by being formed by any one of the above-described manufacturing method. The container with the handle manufactured in this manner has high heat resistance and also, the handle is difficult from being detached from the container body.

Advantage of the Invention

The invention can provide the method for manufacturing the container with the handle, the apparatus for manufacturing the container with the handle capable of performing its manufacturing method, and the container with the handle, in which assembling of the handle to the container body while increasing heat resistance of the container body made of the polyethylene terephthalate resin is capable.

MODE FOR CARRYING OUT THE INVENTION

An example of an embodiment of a method for manufacturing a container with a handle according to the invention will hereinafter be described with reference to the drawings.

First, the container with the handle manufactured by the method for manufacturing the container with the handle according to the invention will be described.

Figure 1:
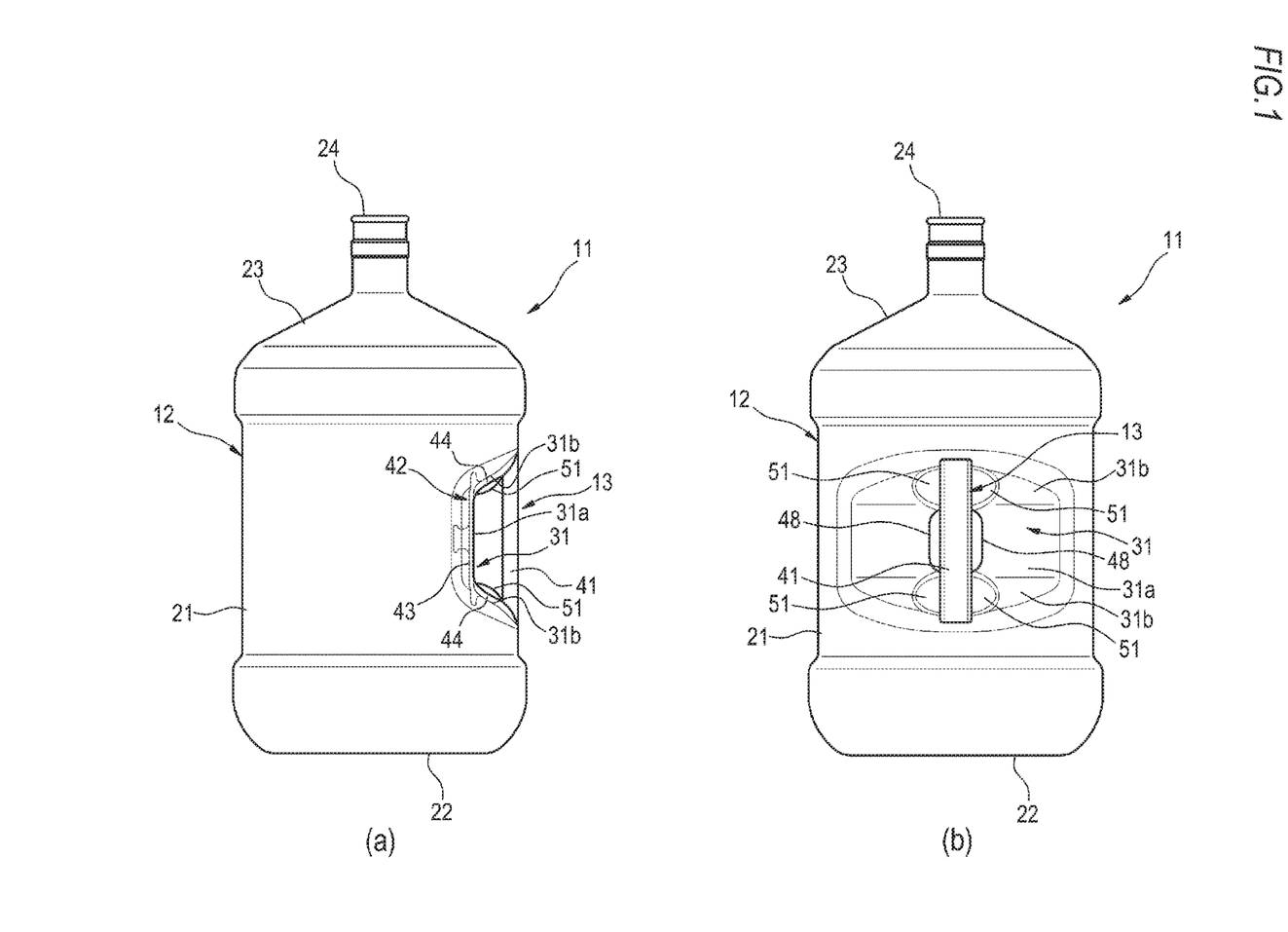
FIG. 1 is a view showing a container with a handle manufactured by a method for manufacturing the container with the handle according to the present embodiment, where (a) is a side view, and (b) is a front view seen from the side of a handle mounting part.

As shown in (a) and (b) of FIG. 1, a container 11 with a handle includes a container body 12, and a handle 13.

The container body 12 is molded of a polyethylene terephthalate (PET) resin. The container body 12 has a trunk part 21 formed in a tubular shape, a bottom part 22 constructing a bottom surface of the trunk part 21, and a shoulder part 23 constructing an upper part of the trunk part 21. Also, the container body 12 has a mouth part 24 in the upper center of the container body 12, and the shoulder part 23 is formed between the mouth part 24 and the trunk part 21. Liquid flows from the mouth part 24 into the container body 12. Also, the liquid of the inside of the container body 12 flows out of the mouth part 24. A lid part (not shown) can be attached to and detached from the mouth part 24, and the container body 12 can be sealed by mounting the lid part to the mouth part 24.

The trunk part 21 has a handle mounting part 31 on a part of the peripheral surface thereof. The handle mounting part 31 is formed in a shape recessed in substantially a recessed shape in a side view, and has a bottom surface part 31a, and wall surface parts 31b at the upper and lower sides of the bottom surface part 31a. The handle 13 is attached to the handle mounting part 31 in the center in a front view.

The handle 13 is molded of, for example, a polypropylene (PP) resin or a polyethylene terephthalate (PET) resin. As shown in (a) and (b) of FIG. 2, the handle 13 has a gripping part 41 formed in a rod shape, and a fixed part 42 joined to the gripping part 41. The gripping part 41 is the portion gripped by a worker in the case of conveyance etc. of the container 11 with the handle. The fixed part 42 is the portion fixed to the container body 12.

Figure 2:
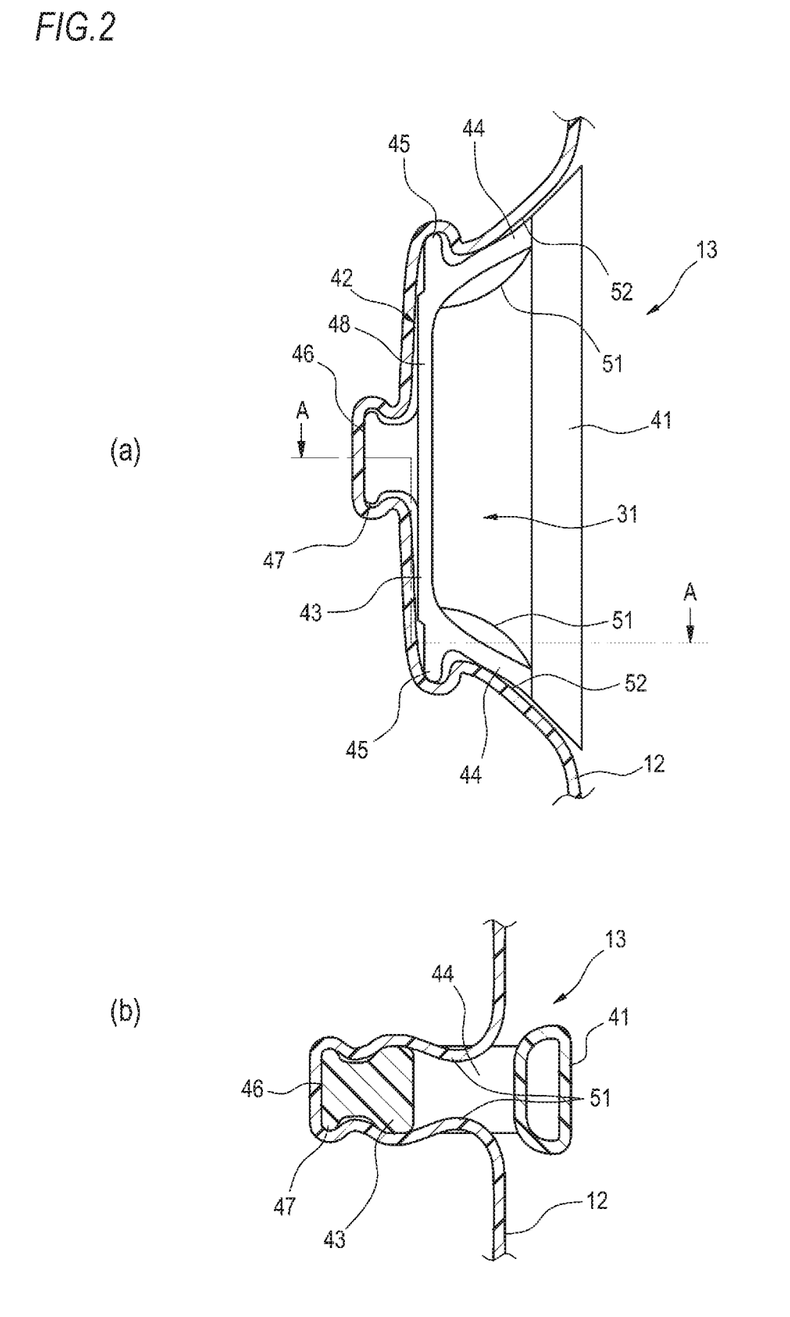
FIG. 2 is a view showing a mounting place of the handle of the container with the handle manufactured by the method for manufacturing the container with the handle according to the embodiment, where (a) is a partially sectional view seen from a side surface, and (b) is a sectional view taken on line A-A in (a).

The fixed part 42 has an attachment rod part 43 arranged in substantially parallel with and to be spaced from the gripping part 41, and joint parts 44 which extend from the upper and lower ends of the attachment rod part 43 toward the upper and lower ends of the gripping part 41 and are joined to the upper and lower ends of the gripping part 41.

The length of the attachment rod part 43 is shorter than that of the gripping part 41. Accordingly, the upper joint part 44 is inclined obliquely upwardly from the attachment rod part 43 toward the gripping part 41, and the lower joint part 44 is inclined obliquely downwardly from the attachment rod part 43 toward the gripping part 41.

The upper and lower ends of the attachment rod part 43 are formed with locking parts 45 protruding in substantially a vertical direction. Also, an intermediate portion of the attachment rod part 43 in the vertical direction is formed with an engaging protruding part 46 protruding to the side opposite to the gripping part 41. The distal end portions of this engaging protruding part 46 are formed with overhang parts 47 overhanging in the vertical direction. Also, the intermediate portion of the attachment rod part 43 in the vertical direction is formed with a pressing piece 48 overhanging in its width direction (both left and right sides) (see (b) of FIG. 1).

As shown in FIGS. 1 and 2, the handle 13 described above is attached to the handle mounting part 31 of the container body 12. The handle mounting part 31 of the container body 12 is formed with a plurality of chevron-shaped protrusions 51. These chevron-shaped protrusions 51 are respectively formed on the upper and lower sides than the pressing piece 48 of the handle 13. These chevron-shaped protrusions 51 are formed by bulging a part of the container body 12 to the outside (side of the gripping part) on both sides of the attachment rod part 43 in the width direction. These chevron-shaped protrusions 51 lock both left and right sides of the joint parts 44 and the upper and lower ends of the attachment rod part 43 constructing the fixed part 42 of the handle 13. Accordingly, movement of the handle 13 in a horizontal direction with respect to the container body 12 is regulated by the chevron-shaped protrusions 51.

Also, the handle mounting part 31 of the container body 12 is formed with a plurality of fitting parts 52. The fitting parts 52 are formed so as to enter the sides of the joint parts 44 beyond the locking parts 45 along the locking parts 45 and the joint parts 44. The fitting parts 52 lock the locking parts 45 of the handle 13. Accordingly, movement of the handle 13 in the vertical direction and a separated direction (the direction in which the handle 13 is separated from the container, the direction from the attachment rod part 43 toward the gripping part 41) with respect to the container body 12 is regulated by the fitting parts 52.

Further, a part of the container body 12 bites into the side of the attachment rod part 43 than the overhang part 47 of the engaging protruding part 46 of the handle 13, and is formed along a shape of the engaging protruding part 46. Accordingly, movement of the handle 13 in the vertical and left-right directions and the separated direction with respect to the container body 12 is regulated.

Next, a method for manufacturing the container 11 with the handle according to the embodiment will be described with reference to FIGS. 3 to 7.

(1) Primary Blow Molding Step

Figure 3:
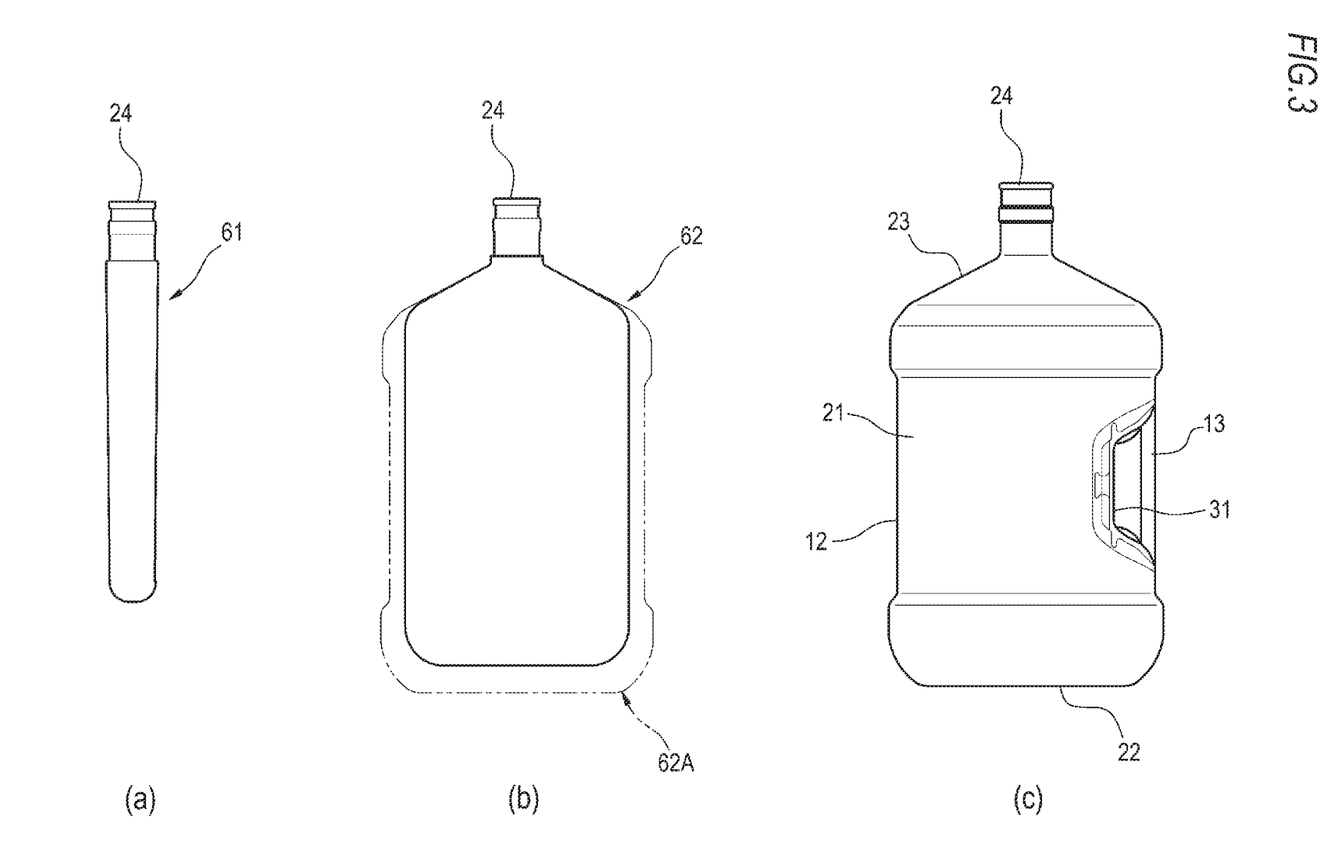
FIG. 3 is a view describing the method for manufacturing the container with the handle according to the embodiment, where (a) is a side view of a preform, (b) is a side view of an intermediate molded body, and (c) is a side view of the container with the handle.

As shown in (a) of FIG. 3, a preform 61 used as the container body 12 is prepared. This preform 61 is molded of a polyethylene terephthalate (PET) resin, and is formed in a bottomed cylindrical shape with the mouth part 24 formed in the upper end.

Then, by blow-molding this preform 61 heated to a temperature suitable for stretching, an intermediate molded body 62 smaller than the container body 12 is molded as shown in (b) of FIG. 3. Specifically, for example, a temperature of a primary blow mold (not shown) is first controlled so as to reach a crystallization temperature or higher (about 140 to 180° C.) of the PET resin by a rod-shaped heater etc. The preform 61 is arranged inside this primary blow mold whose temperature is controlled, and high-pressure air is introduced into the preform 61 for about 20 seconds. The preform 61 into which the high-pressure air is introduced is stretched, and makes contact with an inner wall surface of the primary blow mold, and a primary blow molded product 62A is formed. At this time, a residual stress of the PET resin is relaxed and also, a crystallization density is improved (improvement in heat resistance by heat setting treatment).

Then, after processing for discharging the high-pressure air from the primary blow mold is performed, the primary blow mold is set in an opened state and the primary blow molded product 62A is taken out of the primary blow mold. At this time, the volume of the primary blow molded product 62A is contracted by about 10 to 30% to become the intermediate molded body 62. The intermediate molded body 62 formed in this manner is in a state having the amount of heat sufficient for subsequent treatment.

(2) Secondary Blow Molding Step

Figure 4:
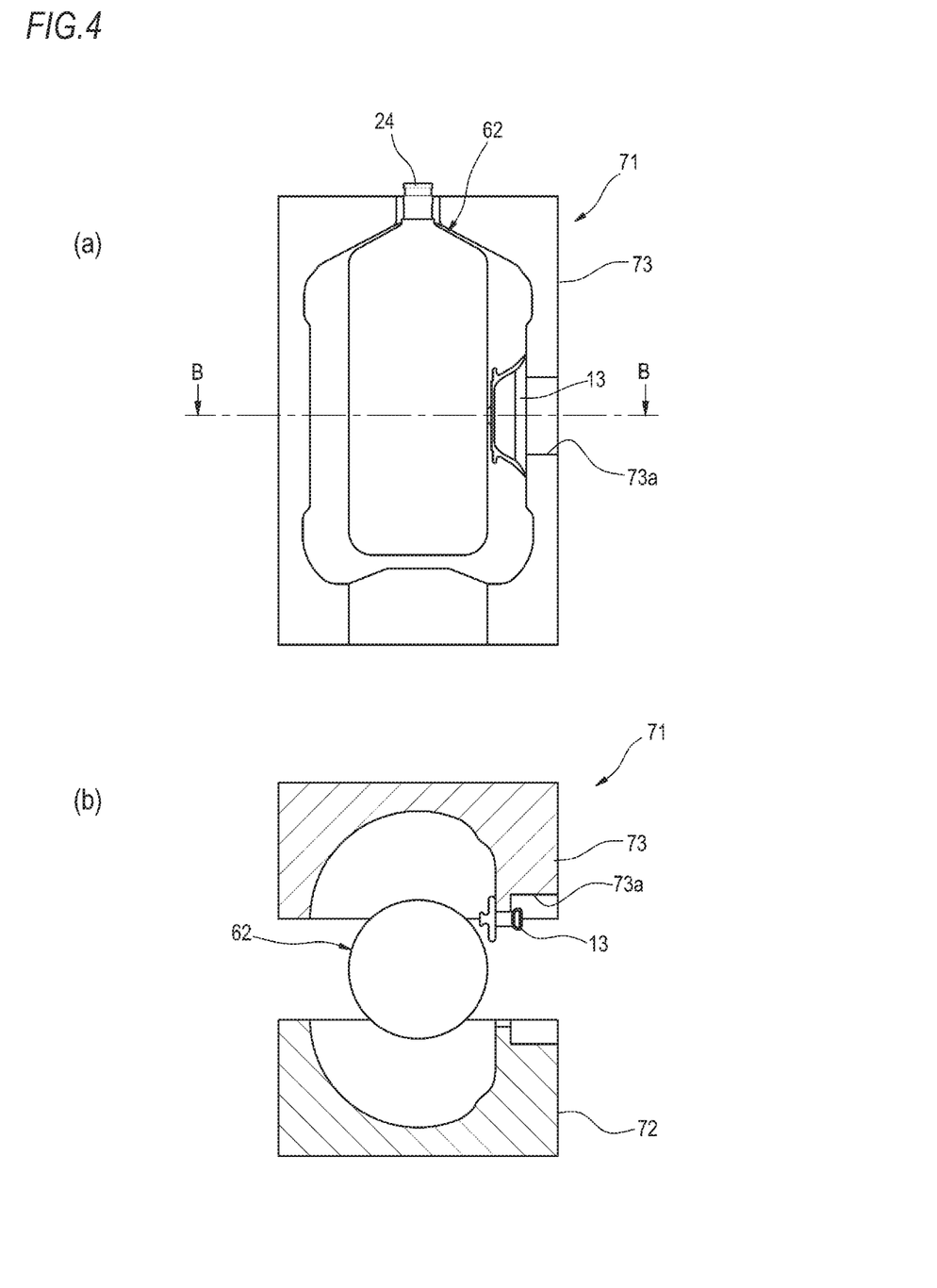
FIG. 4 is a view showing a blow mold used in the method for manufacturing the container with the handle according to the embodiment, where (a) is a side view of a split surface of the blow mold with the mold opened, and (b) is a sectional view taken on line B-B in (a).
Figure 5:
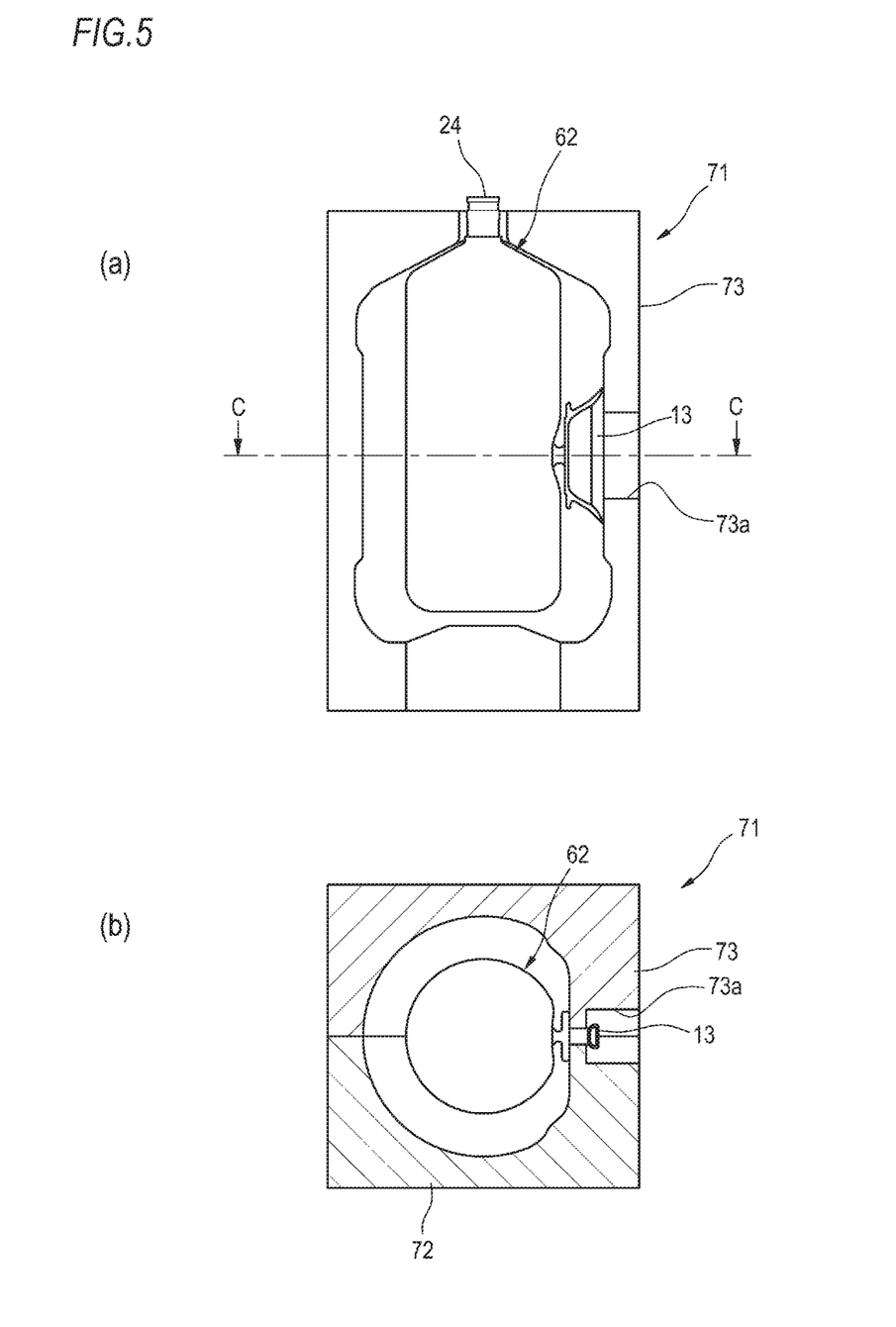
FIG. 5 is a view showing the blow mold used in the method for manufacturing the container with the handle according to the embodiment, where (a) is a side view of the split surface of the blow mold with the mold closed, and (b) is a sectional view taken on line C-C in (a).

As shown in (a) and (b) of FIG. 4, a blow mold 71 is used in a secondary blow molding step. This blow mold 71 is constructed of two split molds 72, 73. The split mold 72 is a mold for molding a horizontal half of the container body 12, and the split mold 73 is a mold for molding a horizontal half of the container body 12 including the handle mounting part 31 to which the handle 13 is attached. The split mold 73 is provided with a handle holding part 73a, and the handle 13 is held by the handle holding part 73a.

In the case of performing blow molding using this blow mold 71, the intermediate molded body 62 is first set in the blow mold 71 by arranging the intermediate molded body 62 inside the blow mold 71 in a state where the split molds 72, 73 are mutually spaced and opened.

From this state, the split molds 72, 73 are brought close to each other and the blow mold 71 is closed. Then, molding surfaces made of inner surfaces of the split molds 72, 73 are arranged in a state close to the periphery of the intermediate molded body 62 as shown in (a) and (b) FIG. 5. Also, at this time, a part of the fixed part 42 of the handle 13 held in the handle holding part 73a makes contact with a peripheral surface of the intermediate molded body 62.

By blow-molding the intermediate molded body 62 in this state, the container 11 with the handle is molded as shown in (c) of FIG. 3. Specifically, for example, by circulating a temperature control medium, a temperature of the blow mold 71 is increased to about 80 to 100° C., and a temperature of the intermediate molded body 62 of the inside of the blow mold 71 is controlled at a temperature (a predetermined temperature) suitable for blowing, and high-pressure air is introduced from the mouth part 24 into the intermediate molded body 62 for about 15 seconds. Then, the intermediate molded body 62 is expanded, and is molded into the container body 12 having a shape along the molding surfaces made of inner wall surfaces of the split molds 72, 73 of the blow mold 71. Also, when the intermediate molded body 62 is expanded to form the container body 12, the handle 13 held in the handle holding part 73a is assembled to the container body 12.

Subsequently, the high-pressure air is discharged from the blow mold 71, and a flow of air is passed through the container for about 15 seconds, and the container body 12 is cooled. Then, the container 11 with the handle is demolded and detached from the blow mold 71 by separating the split molds 72, 73 of the blow mold 71.

Incidentally, when the container body 12 is molded of the polyethylene terephthalate resin, it is difficult to use heat resistance of the resin itself as compared with a polycarbonate resin. However, in the embodiment, a plurality of heat treatments by performing the primary blow molding step and the secondary blow molding step greatly increase heat resistance of the container body 12 made of the polyethylene terephthalate resin. Here, the container 11 with the handle is formed with at least two parting lines (line between a pair of blow split molds) in side view resulting from the primary blow mold and the blow mold 71.

Next, a state where the handle 13 is assembled to the container body 12 will be described.

Figure 6:
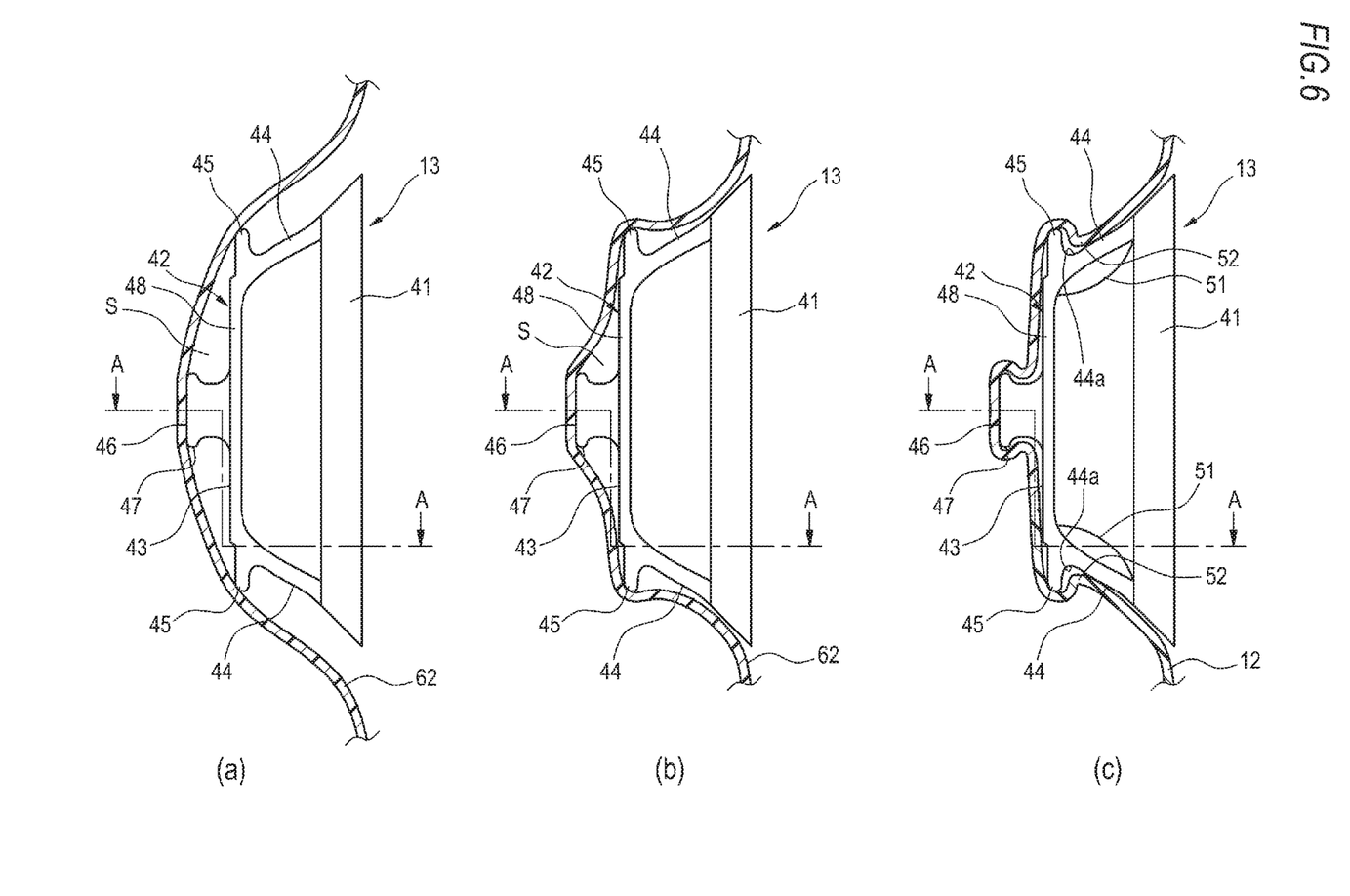
FIG. 6 is a view showing a state where the handle is assembled to a container body, where (a) to (c) are partially sectional views seen from a side surface of the handle portion, respectively.
Figure 7:
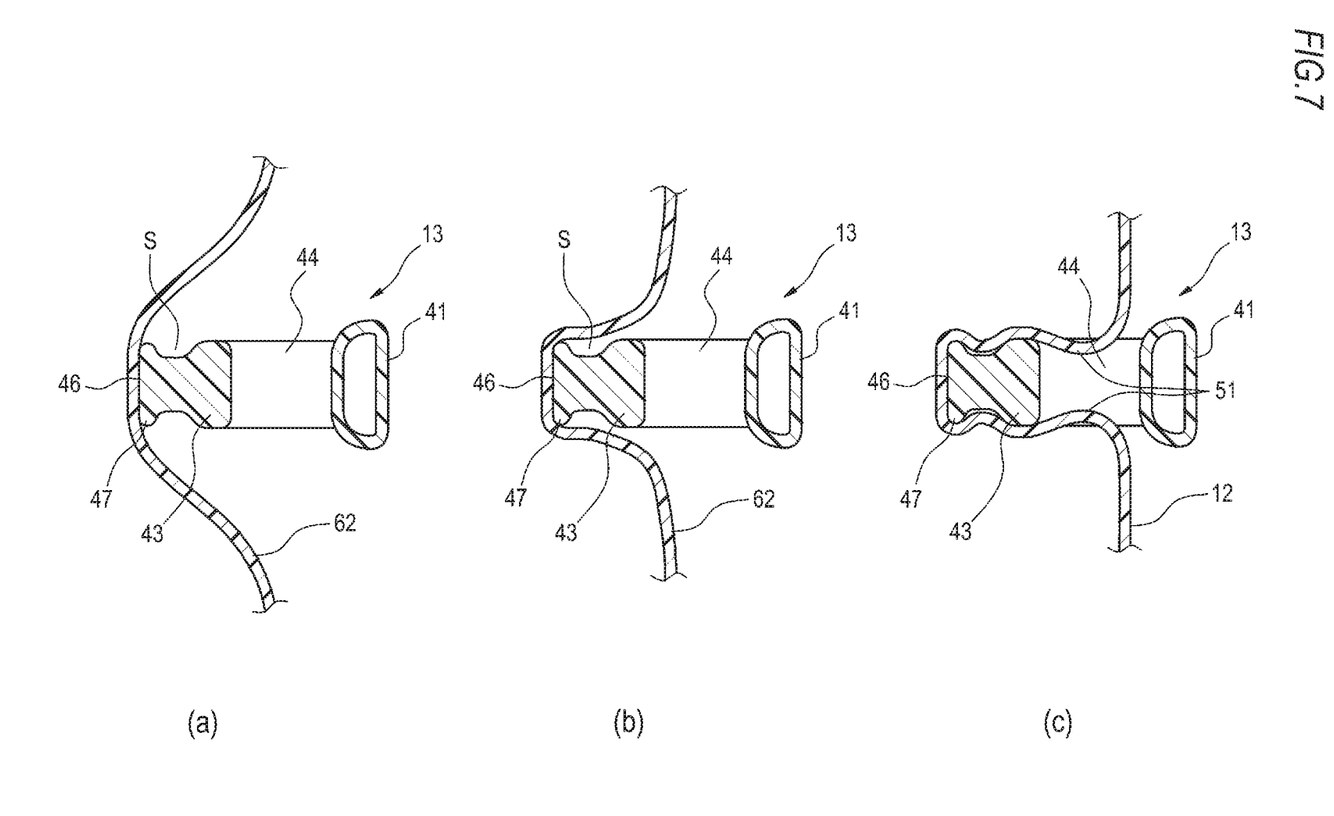
FIG. 7 is a view showing the state where the handle is assembled to the container body, where (a) to (c) are sectional views taken on lines A-A in (a) to (c) of FIG. 6, respectively.

As shown in (a) of FIG. 6 and (a) of FIG. 7, by clamping the blow mold 71 in a state where the intermediate molded body 62 set in the blow mold 71, a part of the fixed part 42 of the handle 13 held in the handle holding part 73a is pushed on a peripheral surface of the intermediate molded body 62 to be brought into contact with the peripheral surface. Accordingly, by pushing the fixed part 42 of the handle 13, the intermediate molded body 62 is elastically deformed and a part of the peripheral surface is arranged along the fixed part 42 of the handle 13.

Also, the attachment rod part 43 of the fixed part 42 of the handle 13 is formed with the engaging protruding part 46 protruding to the side opposite to the gripping part 41. Accordingly, the vertical center portion of the intermediate molded body 62 in the attachment rod part 43 of the fixed part 42 is pressed and curved to the side opposite to the gripping part 41, and the intermediate molded body 62 is formed into a state where a non-contact part S is formed between the intermediate molded body 62 and the attachment rod part 43 of the fixed part 42. This non-contact part S is formed in the vicinity of the periphery of the engaging protruding part 46 of the handle 13 in contact with the intermediate molded body 62. Also, the vertical center portion of the intermediate molded body 62 in the attachment rod part 43 is pressed and curved to the side opposite to the gripping part 41, and thereby, a part of the intermediate molded body 62 is brought close to the vertical vicinity portion of the handle 13.

When blowing is started in this state and the intermediate molded body 62 is expanded, the intermediate molded body 62 is deformed in a shape along an external shape of the fixed part 42 of the handle 13 as shown in (b) of FIG. 6 and (b) of FIG. 7. Since the non-contact part S is formed between the intermediate molded body 62 and the attachment rod part 43 of the fixed part 42 at this time, friction on the attachment rod part 43 is reduced as compared with the case where the whole intermediate molded body 62 is in contact with the attachment rod part 43. Accordingly, the intermediate molded body 62 is easily deformed in the shape along the external shape of the fixed part 42 of the handle 13.

As shown in (c) of FIG. 6 and (c) of FIG. 7, when the blow molding progresses in the secondary blow molding step and the intermediate molded body 62 is further expanded and is molded into the container body 12, a part of the container body 12 enters the upper and lower sides than the pressing piece 48 in both the left and right sides of the fixed part 42 of the handle 13, and these portions form the chevron-shaped protrusions 51.

Then, these chevron-shaped protrusions 51 lock both sides of the left and right of the joint parts 44 and the upper and lower ends of the attachment rod part 43. Accordingly, the handle 13 is assembled to the container body 12 in a state where movement of the handle 13 in the horizontal direction with respect to the container body 12 is regulated by the chevron-shaped protrusions 51.

Also, a part of the container body 12 enters recesses 44a of boundaries between the locking parts 45 and the joint parts 44 and is molded in a shape along the joint parts 44, and these portions form the fitting parts 52. Further, these fitting parts 52 lock the locking parts 45 of the handle 13. Accordingly, the handle 13 is assembled to the container body 12 in a state where movement of the handle 13 in the vertical direction and the separated direction with respect to the container body 12 is regulated by the fitting parts 52.

Further, a part of the container body 12 bites into the side of the attachment rod part 43 than the overhang part 47 of the engaging protruding part 46 of the handle 13. Accordingly, the handle 13 is assembled to the container body 12 in a state where movement of the handle 13 in the vertical and left-right directions and the separated direction with respect to the container body 12 is regulated.

According to the method for manufacturing the container with the handle according to the embodiment as described above, the container body 12 with high heat resistance can be molded of the preform 61 made of the polyethylene terephthalate resin by performing the blow molding a plurality of times in the primary blow molding step and the secondary blow molding step. Further, the handle 13 can be assembled to the intermediate molded body 62 by performing the blow molding with the handle 13 brought close to the intermediate molded body 62 in the secondary blow molding step. Accordingly, the container 11 with the handle made of the polyethylene terephthalate resin with high heat resistance can be manufactured without using the polycarbonate resin.

Also, in the secondary blow molding step, since a part of the handle 13 is pushed on the intermediate molded body 62 to be brought into contact with intermediate molded body 62, the handle 13 can be caused to bite into the container body 12 expanded by the blow molding, and the handle 13 can reliably be assembled to the container body 12.

Particularly, in the secondary blow molding step, by forming the non-contact part S between the handle 13 and the intermediate molded body 62 in the vicinity of a place in which the handle 13 is pushed on the intermediate molded body 62, the intermediate molded body 62 expanded by the blow molding can be smoothly deformed in the periphery of the non-contact part S. Consequently, the handle 13 can more reliably be assembled to the container body 12.

Moreover, the chevron-shaped protrusions 51 lock both sides of the left and right of the joint parts 44 and the attachment rod part 43. Consequently, the handle 13 is assembled to the container body 12 in a state where movement of the handle 13 in the horizontal direction with respect to the container body 12 is regulated by the chevron-shaped protrusions 51. Also, the fitting parts 52 lock the locking parts 45 of the handle 13. Consequently, the handle 13 is assembled to the container body 12 in a state where movement of the handle 13 in the vertical direction and the separated direction with respect to the container body 12 is regulated by the fitting parts 52. Accordingly, strength of fixing of the handle 13 to the container body 12 can be enhanced greatly, and a large-size returnable container capable of, for example, being conveyed well by gripping the handle 13 even when the container has a large capacity can be manufactured.

Next, one example of a configuration of an apparatus for performing the method for manufacturing the container 11 with the handle described above will be described with reference to FIG. 8.

Figure 8:
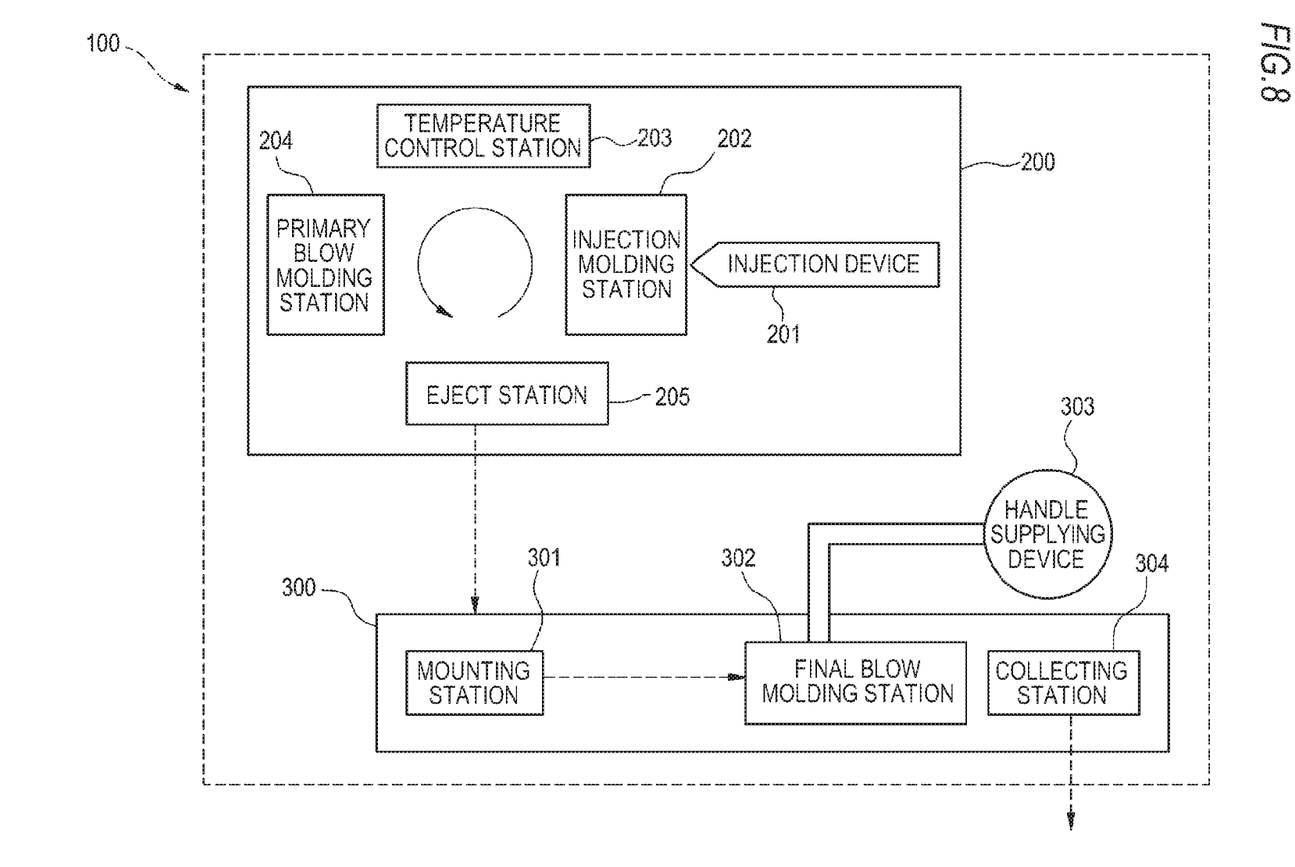
FIG. 8 is a schematic configuration diagram of an apparatus for manufacturing the container with the handle.

As shown in FIG. 8, an apparatus 100 for manufacturing the container with the handle includes a first manufacturing part 200 for manufacturing the intermediate molded body 62 (see FIG. 3), and a second manufacturing part 300 for manufacturing the container 11 (see FIG. 1) with the handle from the intermediate molded body 62.

The first manufacturing part 200 includes an injection device 201 and an injection molding station 202 for injection-molding the preform 61 (see FIG. 3), a temperature control station 203 for controlling a temperature of the preform 61 before primary blowing, a primary blow molding station 204 (one example of primary blow molding means) for forming a primary blow molded product 62A (see FIG. 3) of the preform 61, and a eject station 205.

The primary blow molding station 204 has a primary blow mold and a blow nozzle, and can introduce high-pressure air into the preform 61 arranged inside the primary blow mold using the blow nozzle. The preform 61 into which the high-pressure air is introduced is stretched and makes contact with an inner wall surface of the primary blow mold, and the primary blow molded product 62A is formed. Thus, the primary blow molding station 204 has a function of performing the primary blow molding step described above. The eject station 205 ejects the primary blow molded product 62A out of the primary blow mold, and temporarily stores the intermediate molded body 62 whose volume is contracted by about 10 to 30% from the primary blow molded product 62A.

The second manufacturing part 300 includes a mounting station 301, a final blow molding station 302, a handle supplying device 303, and a collecting station 304. The mounting station 301 mounts the intermediate molded body 62 supplied from the eject station 205 of the first manufacturing part 200 by conveyance means (not shown) to conveyance means (not shown) of the second manufacturing part 300.

The final blow molding station 302 (one example of secondary blow molding means) has the blow mold 71 (see FIG. 4 etc.) and a blow nozzle. The handle supplying device 303 stores the plurality of handles 13 (see FIG. 2), and supplies the handle 13 to the final blow molding station 302. The final blow molding station 302 can introduce high-pressure air into the intermediate molded body 62 using the blow nozzle in a state where the handle 13 supplied from the handle supplying device 303 and the intermediate molded body 62 conveyed by the conveyance means are set in the blow mold 71. Thus, the final blow molding station 302 has a function of performing the secondary blow molding step described above. The collecting station 304 collects the container 11 with the handle conveyed from the final blow molding station 302, and then, conveys the container 11 with the handle, for example, to a predetermined preservation place by a belt conveyor etc.

According to the apparatus 100 for manufacturing the container with the handle having the above configuration, the primary blow molding step and the secondary blow molding step described above can be performed, and the container 11 with the handle made of the polyethylene terephthalate resin with high heat resistance can be manufactured.

Here, the invention is not limited to the embodiment described above, and changes, improvements, etc. can be made appropriately. Moreover, as long as the invention can be achieved, materials, shapes, dimensions, numerical values, forms, the number of components, arrangement places, etc. of each component in the embodiment described above are arbitrary and are not limited.

For example, in the embodiment described above, the preform 61 is blow-molded in the primary blow molding step, and then, the intermediate molded body 62 is blow-molded in the secondary blow molding step. However, preliminary blow treatment of the preform 61 may be performed before the primary blow molding step in order to improve molding stability and quality of the molded product.

Also, the invention can be applied to not only a large-size returnable container with a large capacity of, for example, 3 to 5 gallons (about 12 to 20 liters) but also a container smaller than this large-size returnable container.

Also, although the present example describes that a part of the handle 13 is in contact with the peripheral surface of the intermediate molded body 62 in a state where the blow mold 71 of the secondary blow molding step is closed, it is not limited to this example, and the handle 13 and the intermediate molded body 62 need not make contact. That is, a part of the handle 13 may be arranged in a position near to, namely, in a state close to the peripheral surface of the intermediate molded body 62 in a case where the blow mold 71 is closed.

Next, a modified example of the method for manufacturing the container 11 with the handle described above will be described with reference to FIG. 9. A manufacturing method of the present example differs from the manufacturing method of the above example in that an intermediate molded body 63 having a recess 64 in a part of a side surface is prepared and a handle 13 is arranged in its recess 64 in a state where the handle 13 is not brought into contact with the intermediate molded body 63 at the time of a blow start of a secondary blow molding step.

(1) Primary Blow Molding Step

As a primary blow mold for molding a blow molded product, the primary blow mold having a protrusion for forming a recess in a part of a side wall of the blow molded product is used. By introducing high-pressure air into a preform 61 arranged inside this primary blow mold, the preform 61 is stretched and makes contact with an inner wall surface of the primary blow mold, and a primary blow molded product having the recess in a part of the side wall is formed.

Figure 9:
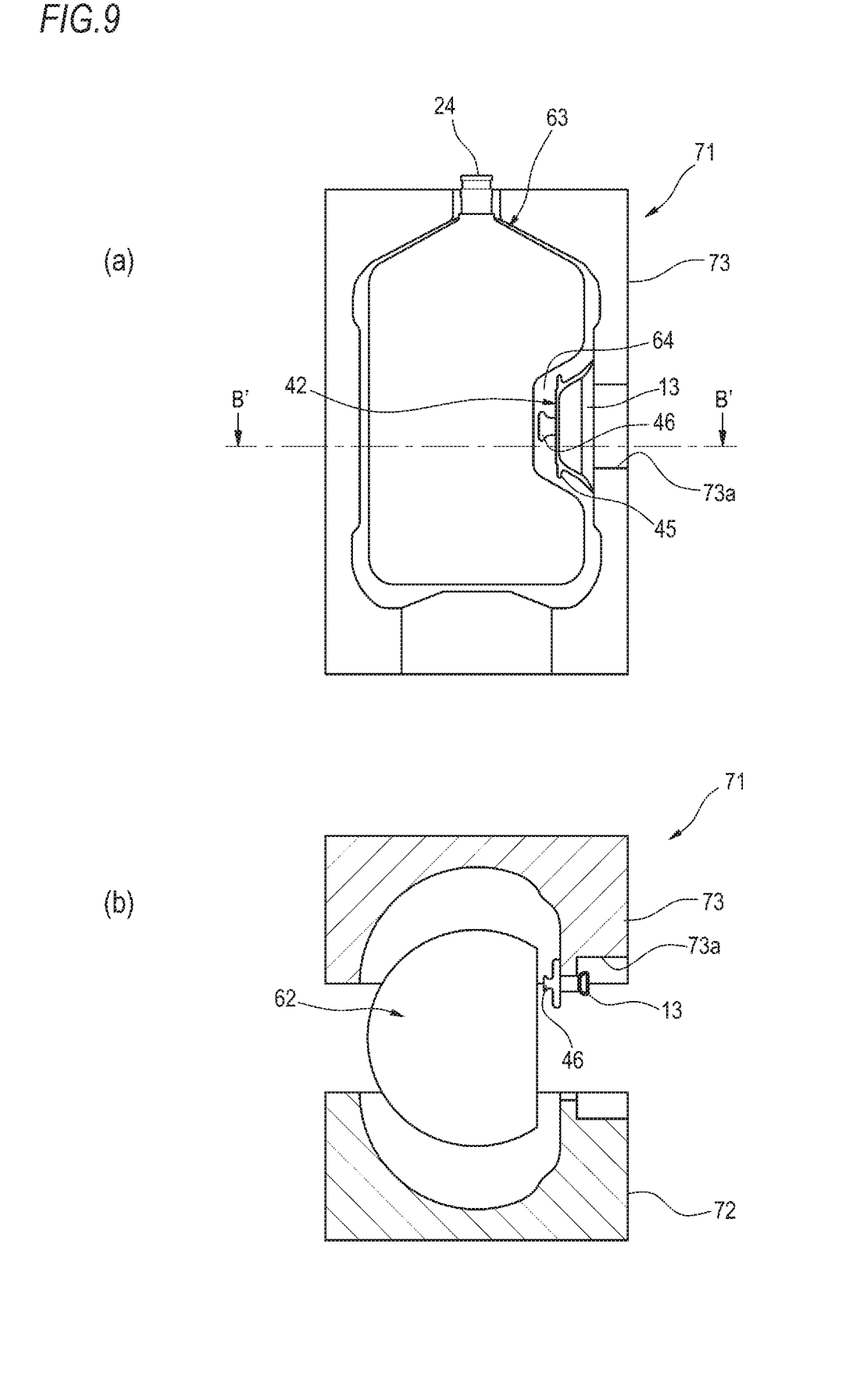
FIG. 9 is a view showing a blow mold used in the method for manufacturing the container with the handle according to a modified example of the embodiment, and (a) is a side view of a split surface of the blow mold with the mold opened, and (b) is a sectional view taken on line B'-B' in (a).

Then, in a manner similar to the above example, the primary blow molded product is taken out of the primary blow mold to thereby form the intermediate molded body (for example, the intermediate molded body 63 shown in FIG. 9) whose volume is contracted by about 10 to 30%. As shown in FIG. 9, the intermediate molded body 63 has the recess 64 in a part of substantially the center of the side wall in a vertical direction.

(2) Secondary Blow Molding Step

As shown in (a) and (b) of FIG. 9, when the intermediate molded body 63 is set inside a blow mold 71 with split molds 72, 73 opened, the portion of the side of a fixed part 42 of the handle 13 held in a handle holding part 73a is arranged inside the recess 64 of the intermediate molded body 63. Further, each of the parts (for example, an engaging protruding part 46, a locking part 45) of the handle 13 arranged inside the recess 64 is arranged in a state where the handle 13 is not brought into contact with a peripheral surface of the recess 64 of the intermediate molded body 63.

Here, although illustration is omitted, each of the parts of the handle 13 held in the handle holding part 73a is arranged in the state where the handle 13 does not make contact with the peripheral surface of the recess 64 of the intermediate molded body 63 even when the split molds 72, 73 are brought close to each other and the blow mold 71 is clamped. Further, the intermediate molded body 63 set inside the blow mold 71 is blow-molded to a size approximate to a finished molded product in the primary blow molding step, and molding surfaces made of inner surfaces of the split molds 72, 73 are arranged in a state closer to the periphery of the intermediate molded body 63.

Then, in a manner similar to the above example, the intermediate molded body 63 is blow-molded to thereby mold the container 11 with the handle.

Next, a state where the handle 13 is assembled to a container body 12 in the present example will be described.

In a state where the blow mold 71 clamped, the handle 13 arranged inside the recess 64 of the intermediate molded body 63 is arranged in a state where each of the parts of the handle 13 does not make contact with the peripheral surface of the intermediate molded body 63 while maintaining substantially an equal distance (space) with respect to the peripheral surface.

In this state, secondary blowing is started and the intermediate molded body 63 is expanded. In a process of expanding the recess 64 of the intermediate molded body 63 at this time, the whole fixed part 42 of the handle 13 substantially simultaneously makes contact with the intermediate molded body 63 and the handle 13 is assembled to the intermediate molded body 63.

Also, in the secondary blow molding step, the intermediate molded body 63 is further expanded and is molded into the container body 12.

According to the method for manufacturing the container with the handle of the present example, the intermediate molded body 63 having the recess 64 is formed in the primary blow molding step. Further, at the time of the blow start of the secondary blow molding step, the handle 13 held in a handle holding part 73a is arranged inside the recess 64 of the intermediate molded body 63 set inside the blow mold 71. Also, the handle 13 arranged inside the recess 64 is arranged in the state where the handle 13 does not make contact with the peripheral surface of the intermediate molded body 63.

Accordingly, in a process of expanding the recess 64 of the intermediate molded body 63 at the time of the secondary blow molding step, the whole portion of the side of the fixed part 42 of the handle 13 substantially simultaneously tends to make contact with the intermediate molded body 63, and pressure becomes resistant to concentrating on a specific portion of an expanded region. As a result, occurrence of defects in molding, for example, occurrence of uneven wall thickness distribution or occurrence of a burst in a part (particularly, a portion in contact with the engaging protruding part 46) of the intermediate molded body can be suppressed in the process of expanding the intermediate molded body 63.

Also, since the intermediate molded body 63 is formed with the recess 64, a distance (gap) between the peripheral surface of the intermediate molded body 63 and each part of the handle 13 arranged inside the recess 64 can be previously adjusted to accurately set a relative position of the intermediate molded body 63 with respect to the handle 13.

Also, in the present example, a shape of the intermediate molded body 63 set inside the blow mold 71 is molded in a shape approximate to a finished molded product in the primary blow molding step. As a result, the finished molded product formed in the secondary blow molding step can be molded stably with high quality.

The invention has been described in detail with reference to the specific embodiment, but it is apparent to those skilled in the art that various changes or modifications can be made without departing from the spirit and scope of the invention.

The present application is based on Japanese patent application (patent application No. 2013-171015) filed on Aug. 21, 2013, and the contents of the patent application are hereby incorporated by reference.

DESCRIPTION OF REFERENCE NUMERALS AND SIGNS

11: CONTAINER WITH HANDLE
13: HANDLE
41: GRIPPING PART
43: ATTACHMENT ROD PART
44: JOINT PART
45: LOCKING PART
51: CHEVRON-SHAPED PROTRUSION
52: FITTING PART
61: PREFORM
62,63: INTERMEDIATE MOLDED BODY
64: RECESS
71: BLOW MOLD
S: NON-CONTACT PART
204: PRIMARY BLOW MOLDING STATION
302: FINAL BLOW MOLDING STATION

The invention claimed is:

1. A method for manufacturing a container with a handle, the method comprising:
  a primary blow molding step of blow-molding a preform made of a polyethylene terephthalate resin by using a primary blow mold to mold an intermediate molded body; and a secondary blow molding step of assembling the handle to a container body, which is made of the intermediate molded body expanded inside a secondary blow mold, by arranging: (i) the intermediate molded body which has been taken out from the primary blow mold; and (ii) the handle which has been supplied from a handle supplying device and is a different member from the intermediate molded body; inside the secondary blow mold and blow-molding the intermediate molded body in a state where the handle is brought close to the intermediate molded body, wherein, in the secondary blow molding step, a part of the handle is pushed on the intermediate molded body to be brought into contact with the intermediate molded body.

2. The method for manufacturing the container with the handle according to claim 1, wherein, in the secondary blow molding step, a non-contact part between the handle and the intermediate molded body is formed in a vicinity of a place in which the handle is pushed on the intermediate molded body.

3. The method for manufacturing the container with the handle according to claim 1, wherein, in the secondary blow molding step, the handle is only fixed to the intermediate molded article at the container body.

4. A method for manufacturing a container with a handle, the method comprising:

a primary blow molding step of blow-molding a preform made of a polyethylene terephthalate resin by using a primary blow mold to mold an intermediate molded body; and a secondary blow molding step of assembling the handle to a container body, which is made of the intermediate molded body expanded inside a secondary blow mold, by arranging: (i) the intermediate molded body which has been taken out from the primary blow mold; and (ii) the handle which has been supplied from a handle supplying device and is a different member from the intermediate molded body; inside the secondary blow mold and blow-molding the intermediate molded body in a state where the handle is brought close to the intermediate molded body, wherein, in the primary blow molding step, a recess is formed to a part of the intermediate molded body, and wherein, at the time of a blow start in the secondary blow molding step, the handle is arranged in the recess of the intermediate molded body in a state where the handle is not brought into contact with the intermediate molded body.

5. A method for manufacturing a container with a handle, the method comprising:

a primary blow molding step of blow-molding a preform made of a polyethylene terephthalate resin by using a primary blow mold to mold an intermediate molded body; and a secondary blow molding step of assembling the handle to a container body, which is made of the intermediate molded body expanded inside a secondary blow mold, by arranging: (i) the intermediate molded body which has been taken out from the primary blow mold; and (ii) the handle which has been supplied from a handle supplying device and is a different member from the intermediate molded body; inside the secondary blow mold and blow-molding the intermediate molded body in a state where the handle is brought close to the intermediate molded body, wherein, in the primary blow molding step, a recess is formed to a part of the intermediate molded body, and wherein the handle includes a rod-shaped gripping part capable of being gripped, an attachment rod part joined to the gripping part at upper and lower ends thereof by joint parts and arranged so as to be spaced from the gripping part, and locking parts protruding in substantially a vertical direction from the upper and lower ends of the attachment rod part, and wherein, in the secondary blow molding step, the attachment rod part is arranged in a state brought close to the intermediate molded body, chevron-shaped protrusions, which are made of a part of the container body, protrude toward a side of the gripping part and lock the attachment rod part and the joint parts, are molded at both sides of the attachment rod part in a width direction, and fitting parts, which are made of a part of the container body, enter the joint parts sides than the locking parts and lock the locking parts, are also molded.

* * * * *